(12) United States Patent
Ehrmantraut et al.

(10) Patent No.: US 12,230,156 B2
(45) Date of Patent: Feb. 18, 2025

(54) SYSTEM FOR NAVIGATING AN AIRCRAFT BASED ON INFRARED BEACON SIGNALS

(71) Applicant: Aurora Flight Sciences Corporation, Manassas, VA (US)

(72) Inventors: Adam Ehrmantraut, Dumfries, VA (US); Melissa Dominguez, Manassas, VA (US); Amaresh Emani, Westborough, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 186 days.

(21) Appl. No.: 17/376,409

(22) Filed: Jul. 15, 2021

(65) Prior Publication Data

US 2022/0028289 A1   Jan. 27, 2022

Related U.S. Application Data

(60) Provisional application No. 63/055,682, filed on Jul. 23, 2020.

(51) Int. Cl.
*G08G 5/02* (2006.01)
*G01S 1/70* (2006.01)
*G08G 5/00* (2006.01)
*H04B 10/60* (2013.01)

(52) U.S. Cl.
CPC ............ *G08G 5/025* (2013.01); *G01S 1/7038* (2019.08); *G08G 5/0047* (2013.01); *H04B 10/60* (2013.01)

(58) Field of Classification Search
None
See application file for complete search history.

(56) References Cited

U.S. PATENT DOCUMENTS

| 2,226,860 A | 12/1940 | Greig |
| 2,944,151 A | 7/1960 | Whitney et al. |
| 3,403,254 A | 9/1968 | Campanella |

(Continued)

FOREIGN PATENT DOCUMENTS

KR   20170056098 A * 5/2017 ........... G08G 5/0069

OTHER PUBLICATIONS

W. Roozing and A. H. Göktoğan, "Low-cost vision-based 6-DOF MAV localization using IR beacons," 2013 IEEE/ASME International Conference on Advanced Intelligent Mechatronics, Wollongong, NSW, Australia, 2013, pp. 1003-1009, doi: 10.1109/AIM.2013.6584225. (Year: 2013).*

*Primary Examiner* — Jonathan M Dager
*Assistant Examiner* — Charles Pall
(74) *Attorney, Agent, or Firm* — Harrity & Harrity, LLP (57) ABSTRACT

A system for facilitating navigation of an aircraft comprises one or more processors and a memory coupled to the processors. The memory stores data into a data store and program code that, when executed by the processors, causes the system to detect an infrared site signal indicating a site code transmitted by one or more infrared beacons that form a beacon network around a site. The site code represents a site. In response to detecting the infrared site signal, the system determines the site indicated by the site code. The system searches for two or more infrared beacon signals and detects the two or more infrared beacon signals. In response to detecting the two or more infrared beacon signals, the system determines a location of the aircraft based on the two or more infrared beacon signals.

20 Claims, 8 Drawing Sheets

(56) References Cited

U.S. PATENT DOCUMENTS

| | | |
|---|---|---|
| 3,610,930 A | 10/1971 | Lacy et al. |
| 3,671,963 A | 6/1972 | Assouline et al. |
| 6,216,087 B1 | 4/2001 | Want et al. |
| 7,679,528 B1 * | 3/2010 | Etherington .......... G01S 1/7038 |
| | | 701/1 |
| 9,463,706 B2 | 10/2016 | Bell et al. |
| 2013/0308939 A1 * | 11/2013 | Armentrout .............. G01S 1/70 |
| | | 398/38 |
| 2016/0009413 A1 * | 1/2016 | Lee ......................... B64F 1/222 |
| | | 701/16 |
| 2017/0108872 A1 | 4/2017 | Mannefred et al. |
| 2017/0225800 A1 * | 8/2017 | Holt ....................... B64U 70/80 |
| 2020/0198122 A1 * | 6/2020 | Newman ................ B25J 13/006 |

\* cited by examiner

SYSTEM FOR NAVIGATING AN AIRCRAFT BASED ON INFRARED BEACON SIGNALS

CROSS-REFERENCE TO RELATED APPLICATION

This application claims priority to U.S. Provisional Application No. 63/055,682, filed Jul. 23, 2020. The contents of the application are incorporated herein by reference in its entirety.

INTRODUCTION

The subject disclosure relates to a system and method for navigating an aircraft. More particularly, the subject disclosure is directed towards a system for determining a location of an aircraft based on two or more infrared beacon signals.

BACKGROUND

Global positioning systems (GPS) are commonly used in aircraft for localization as well as to correct errors that occur over time with an inertial navigation system. However, GPS systems are based on radio frequency signals, which are relatively easy to jam or spoof. As a result, GPS-based systems may not be relied upon during takeoff, localization, and landing in an aircraft.

An automatic landing system for an aircraft fully automates the landing procedure of an aircraft, while the flight crew supervises the process. Since most inertial navigation systems have a relatively high drift rate, they are not included in an automatic landing system without GPS or some other positioning correction system. One alternative is a highly accurate inertial navigation system that provides the accuracy required for an automatic landing system. However, these highly accurate inertial navigation systems are extremely expensive, thereby making them impractical to use on aircraft.

SUMMARY

According to several aspects, a system for facilitating navigation of an aircraft is disclosed. The system comprises one or more processors and a memory coupled to the one or more processors. The memory stores data into a data store and program code that, when executed by the one or more processors, causes the system to detect an infrared site signal indicating a site code, where the site code represents a site. In response to detecting the infrared site signal, the system determines the site indicated by the site code, where two or more infrared beacons that form a beacon network around the site each transmit the infrared site signal. The system also searches for two or more infrared beacon signals. Each infrared beacon signal is transmitted by an individual beacon of the beacon network. The system further detects the two or more infrared beacon signals. In response to detecting the two or more infrared beacon signals, the system determines a location of the aircraft based on the two or more infrared beacon signals.

In another aspect, a method for navigating an aircraft is disclosed. The method comprises detecting, by an infrared receiver, an infrared site signal indicating a site code. The site code represents a site for the aircraft. In response to detecting the infrared site signal, the method comprises determining the site indicated by the site code by a computer, where two or more infrared beacons that form a beacon network each transmit the infrared site signal. The method also comprises searching, by the infrared receiver, for two or more infrared beacon signals. Each infrared beacon signal corresponds to an individual beacon of the beacon network. The method also comprises detecting, by the infrared receiver, two or more infrared beacon signals. In response to detecting the two or more infrared beacon signals, the system triangulates, by the computer, a location of the aircraft based on the two or more infrared beacon signals. Finally, the method comprises updating a current location of the aircraft with the location.

In yet another aspect, a non-transitory computer readable storage medium readable by a processing circuit and storing instructions for execution by the processing circuit for performing method operations is disclosed. The method operation comprises receiving, from an infrared receiver, an infrared site signal indicating a site code. The site code represents a landing site for the aircraft. In response to receiving the infrared site signal, the method operation comprises determining the landing site indicated by the site code, where two or more infrared beacons that form a beacon network around the landing site each transmit the infrared site signal. The method operation also comprises initiating a scan by the infrared receiver, for two or more infrared beacon signals. Each infrared beacon signal corresponds to an individual beacon of the beacon network. In response to detecting the two or more infrared beacon signals, triangulating, by the computer, the method comprises a location of the aircraft based on the two or more infrared beacon signals. Finally, the method operation comprises updating a current location of the aircraft with the location, wherein the current location of the aircraft is determined based on measurements from an inertial measurement unit.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the subject disclosure in any way.

DETAILED DESCRIPTION

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably The subject disclosure is directed towards a system for navigating an aircraft (either manned or unmanned) to a site based on two or more infrared beacon signals, where the system determines a location of the aircraft based on the two or more infrared beacon signals. In an embodiment, the aircraft is guided towards a site, such as a landing site, however, the site may also be a waypoint, a delivery site, or any other location. The infrared beacon signals are each generated by two or more infrared beacons that form a beacon network around the landing site for the aircraft. Examples of the aircraft may be or include a fixed wing aircraft, a helicopter, a rotorcraft, an unmanned aerial vehicle (e.g., a drone or a satellite), a spacecraft, and the like. The system also comprises an infrared receiver in communication (e.g., electronic communication) with a navigational computer, where infrared receiver detects an infrared site signal that indicates a site code representing the landing site for the aircraft. The navigational computer determines the landing site by comparing the site code indicated by the infrared site signal with a site code data store. The infrared receiver than detects two or more infrared beacon signals, where each infrared beacon signal corresponds to an individual beacon that is part of the beacon network. The navigational computer then determines a location of the aircraft by triangulation of the two or more infrared beacon signals. The navigational computer then updates a current location of the aircraft with the location determined based on the infrared beacon signals. The current location of the aircraft is determined based on measurements from an inertial measurement unit.

The following description is merely exemplary in nature and is not intended to limit the subject disclosure, application, or uses.

Figure 1:
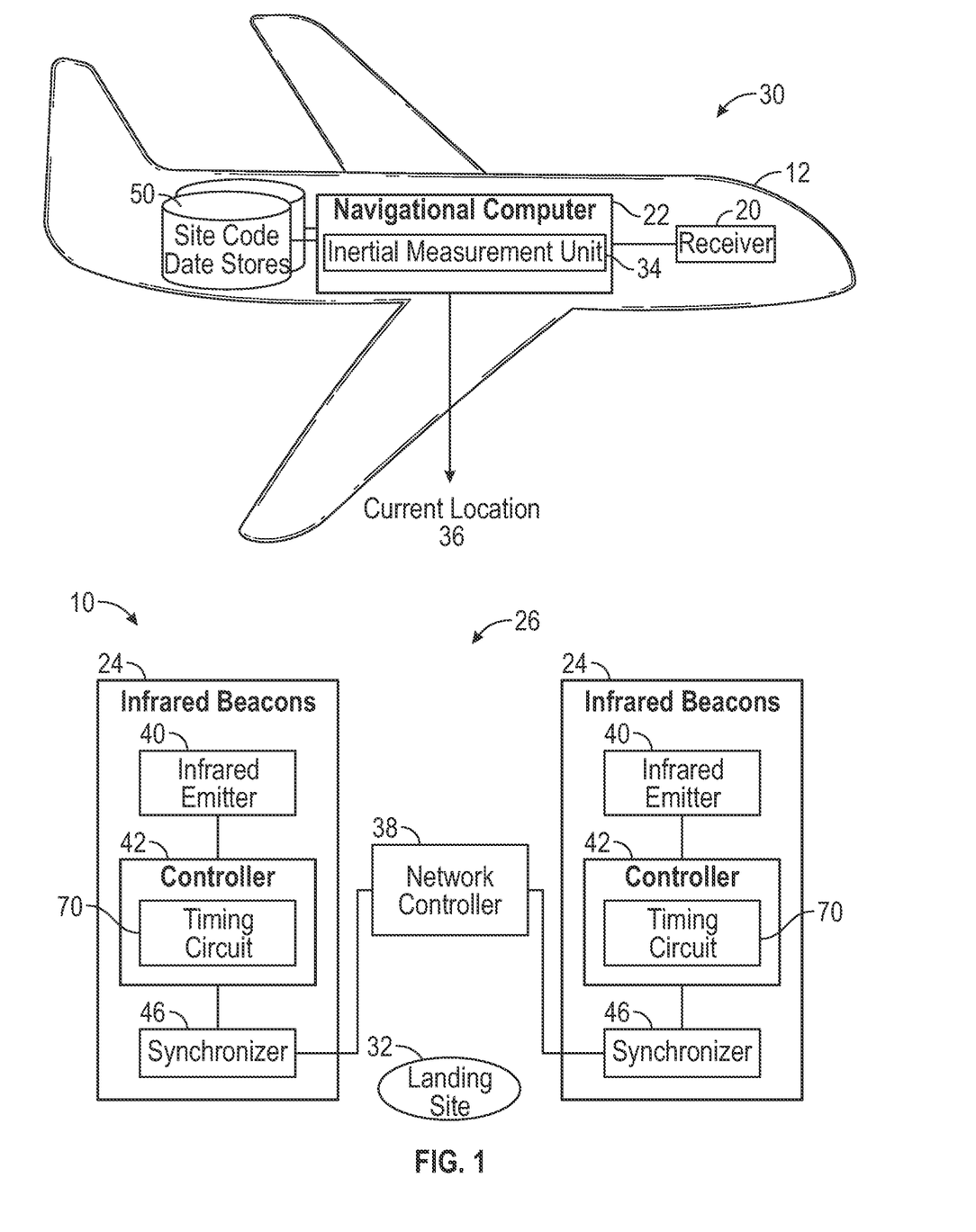
FIG. 1 is a schematic diagram of the disclosed system comprising an aircraft having an infrared receiver and two or more infrared beacons that form a beacon network, according to an exemplary embodiment.

Referring to FIG. 1, a schematic diagram of a system 10 for navigating an aircraft 12 is illustrated. The system 10 comprises an infrared receiver 20 and one or more navigational computers 22 in electronic communication with the infrared receiver 20, where the infrared receiver 20 and the navigational computer 22 are included on the aircraft 12. While FIG. 1 depicts the navigational computer 22 as part on the aircraft 12, the navigational computer 22 may be located elsewhere and be in networked communication with the aircraft 12 as well. The system 10 also comprises two or more infrared beacons 24 that are part of a beacon network 26. In the exemplary embodiment as shown in FIG. 1, the aircraft 12 is traveling in three-dimensional airspace 30 towards a landing site 32. The system 10 navigates the aircraft 12 to the landing site 32. The two or infrared beacons 24 form the beacon network 26 at and/or around the landing site 32 for the aircraft 12. Specifically, in one example, three or more infrared beacons 24 are spaced at about 120° around the landing site 32. The landing site 32 represents a point in space on or above ground where the aircraft 12 navigates and performs tasks such as landing hover, deliver payload, surveille, and the like. The infrared beacons 24 each comprise a respective infrared emitter 40 configured to emit infrared signals, a controller 42 in electronic communication with the infrared emitter 40, and a synchronizer 46. Each infrared beacon 24 is in wireless communication with a network controller 38 by the respective synchronizer 46.

As explained below, the system 10 is configured to determine a location of the aircraft 12 in airspace 30 based on the infrared signals that are emitted by the infrared emitters 40 of the infrared beacons 24. In one non-limiting embodiment, the navigational computer 22 of the aircraft 12 comprises an inertial measurement unit 34 that collects inertial measurement data. In one embodiment, the navigational computer 22 may determine a current location 36 of the aircraft 12 based on the inertial measurement data collected by the inertial measurement unit 34. The navigational computer 22 then updates the current location 36 of the aircraft 12 with the location of the aircraft 12 determined based on the infrared signals. In an example, the navigational computer 22 is part of a navigational system for the aircraft 12. For example, in one embodiment the navigational computer 22 is part of an automatic landing system that navigates the aircraft 12 to the specific landing site 32. Although an automatic landing system is described, it is to be appreciated that the navigational computer 22 may be used in other systems as well.

Figure 2:
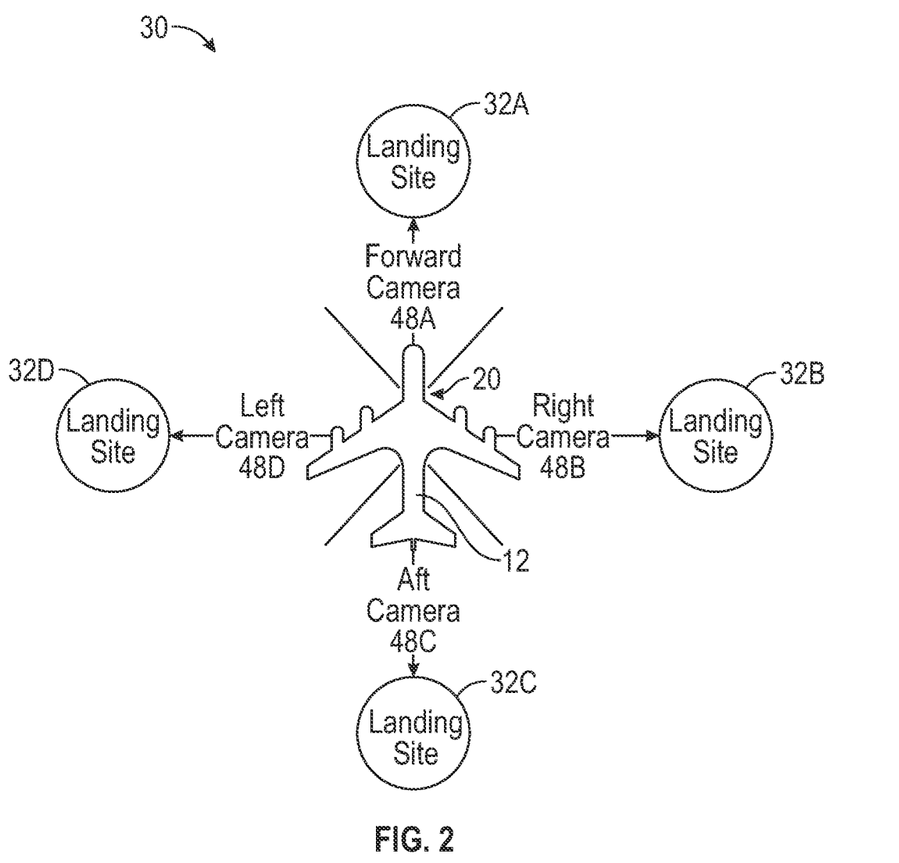
FIG. 2 is a schematic diagram of the aircraft surrounded by four unique landing sites, according to an exemplary embodiment.

FIG. 2 is a schematic diagram of the aircraft 12 shown in FIG. 1 in airspace 30, where the aircraft 12 is surrounded by four unique landing sites 32A, 32B, 32C, 32D. Referring to both FIGS. 1 and 2, in an embodiment the infrared receiver 20 of the aircraft 12 comprises a plurality of infrared cameras 48A-48D. For example, in the non-limiting embodiment as shown in FIG. 2, the infrared receiver 20 comprises four infrared sensors, such as infrared cameras 48A, 48B, 48C, 48D arranged to provide a full 360° view around the aircraft 12, where the infrared camera 48A is the forward camera, infrared camera 48B is the right camera, infrared camera 48C is the aft camera, and 48D is the left camera. However, it is to be appreciated that FIG. 2 is merely exemplary in nature, and in some embodiments the view of the infrared cameras 48 encompass less than the 360° view based on specific requirements of the system 10. In an embodiment, the infrared cameras 48 are rotatable to provide a view up to 360°. As explained below, in one embodiment, the navigational computer 22 (FIG. 1) determines the location of the aircraft 12 based on the plurality of landing sites 32A, 32B, 32C, 32D that surround the aircraft 12.

Figure 3:
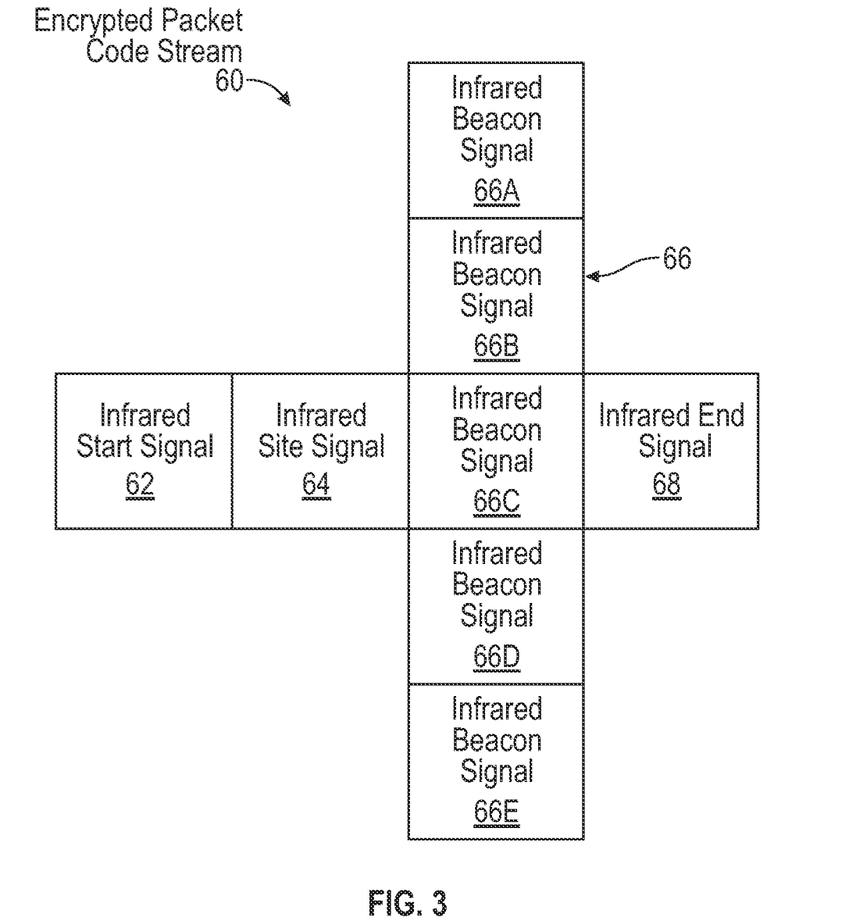
FIG. 3 illustrates an encrypted code packet code stream emitted by the infrared beacons that are part of the beacon network, according to an exemplary embodiment.

Referring back to FIG. 1, the navigational computer 22 of the aircraft 12 is in electronic communication with one or more site code data stores 50. The site code data stores 50 are configured to store a plurality of site codes, where each site code corresponds to and identifies a specific landing site of the aircraft 12. The site code data stores 50 also identify geo-reference points associated with each infrared beacon 24 that is part of the beacon network 26 located around the landing site 32. The infrared receiver 20 receives infrared beacon signals from the two or more infrared beacons 24, where the infrared beacon signals comprise of an encrypted packet code stream 60 (seen in FIG. 3). Referring to FIG. 3, the encrypted packet code stream 60 comprises of an infrared site signal 64 that is emitted by all of the infrared beacons 24. The infrared site signal 64 comprises the site code that indicates the landing site 32 of the aircraft 12.

Figure 4:
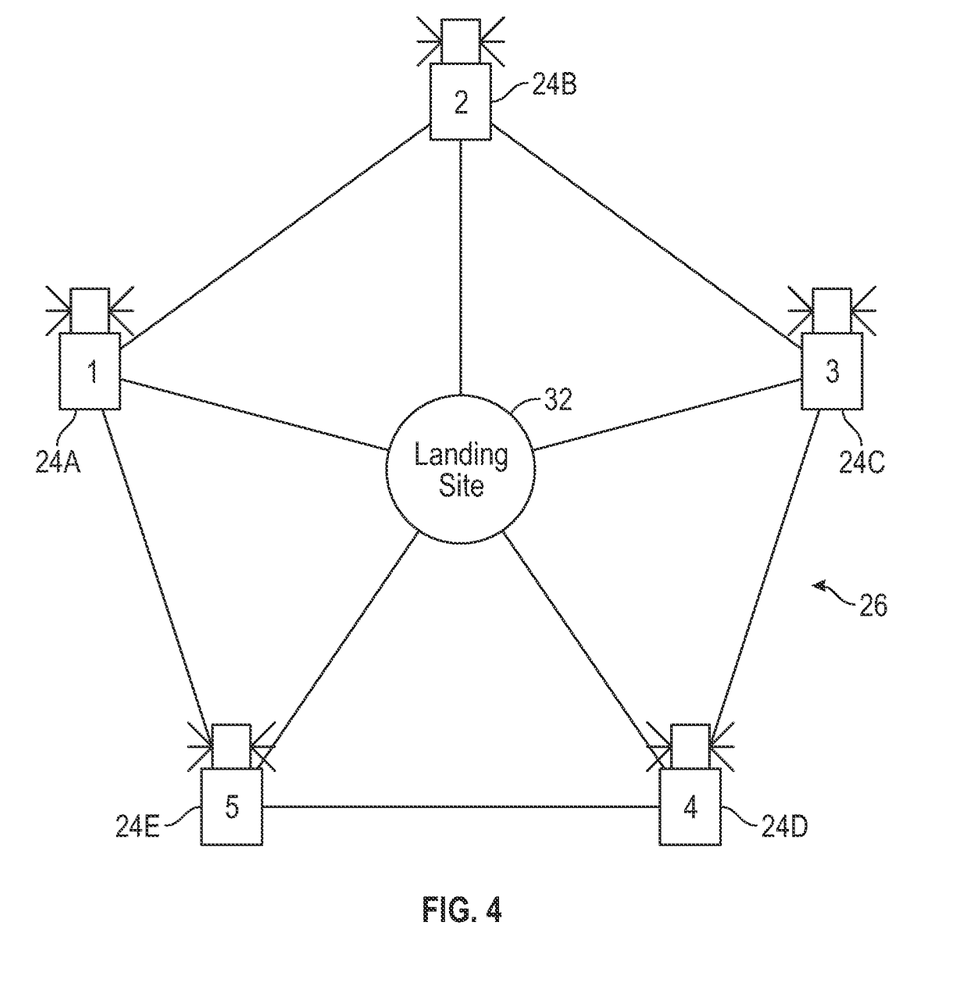
FIG. 4 is a schematic diagram of a landing site and a network of infrared beacons that surround the landing site, according to an exemplary embodiment.

Referring to FIGS. 1 and 3, in one example the two or more infrared beacons 24 are located at a particular airport, such as O'Hare International Airport. Accordingly, the infrared site signal 64 transmitted by each of the infrared beacons 24 comprises a site code associated with the particular airport as O'Hare International Airport. The navigational computer 22 then looks up the site code in the site code data store 50 and determines the two or more infrared beacons 24 are located at O'Hare International Airport. The site code data store 50 also indicates the specific geo-reference points for each infrared beacon 24 that is part of the beacon network 26 located at O'Hare International Airport. For example, in the example as shown in FIG. 4, if the beacon network 26 were located at O'Hare International Airport, then the site code data store 50 indicates the geo-reference points for each of the infrared beacons 24A-24E. Although an airport is described, it is to be appreciated that the site code is not limited to airports, and may represent other locations a well such as, for example, a helipad location, an emergency landing location, a waypoint, or any other destination that is marked as a point in space where a specific task is to be achieved by the aircraft 12, such as landing.

Referring to FIG. 1, each infrared beacon 24 comprises a corresponding infrared emitter 40 configured to emit infrared beacon signals in a pulsed format. The infrared emitter 40 is an incoherent infrared light source such as, for example, an infrared light emitting diode (LED). Each infrared beacon 24 comprises a corresponding controller 42 that controls the infrared emitter 40. The controller 42 comprises a timing circuit 70 configured to instruct the infrared emitter 40 to generate the infrared beacon signal in a coded pulse. The controller 42 is in electronic communication with a corresponding synchronizer 46, and the synchronizer 46 is in wireless communication with the network controller 38. The network controller 38 provides updates and encryption keys to the synchronizer 46 for each infrared beacon 24. The synchronizer 46 is configured to synchronize the corresponding timing circuit 70 with the remaining infrared beacons 24 that are part of the beacon network 26. Some network approaches that may be used to synchronize the infrared beacons 24 comprise protocols such as, but not limited to, network time protocol (NTP) or precision time protocol (PTP).

In one embodiment, the infrared emitter 40 corresponding to each infrared beacon 24 is configured to emit either medium wave infrared signals or long wave infrared signals. Medium wave infrared signals represent a subset of the infrared band of the electromagnetic spectrum covering the wavelengths ranging from about 3 micrometers (μm) to 5 μm, while long wave infrared signals represent a subset of the infrared band of the electromagnetic spectrum covering wavelengths ranging from about 8 μm to 14 μm. In one example, the infrared emitter 40 emits either a medium wave infrared signal having a wavelength of 4 μm or a long wave infrared signal having a wavelength of 9 μm. However, it is to be appreciated that the infrared emitter 40 is not limited to a specific wavelength, and in some embodiments a short wave infrared signal may be used as well.

Referring to FIG. 3, the encrypted packet code stream 60 is now described. The encrypted packet code stream 60 comprises of an infrared start signal 62, the infrared site signal 64, a plurality of infrared beacon signals 66, and an infrared end signal 68. The infrared beacons 24 first emit the infrared start signal 62 together, simultaneously. After the infrared start signal 62 has been emitted, the infrared beacons 24 then emit the infrared site signal 64 simultaneously. The infrared beacons 24 then emit the individual infrared beacon signals 66 separately in a sequential manner. Each individual infrared beacon signal 66 corresponds to one of the individual infrared beacons 24. For example, referring to both FIGS. 3 and 4, the first individual infrared beacon signal 66A corresponds to the first infrared beacon 24A, the second individual infrared beacon signal 66B corresponds to the second infrared beacon 24B, the third individual infrared beacon signal 66C corresponds to the third infrared beacon 24C, the fourth individual infrared beacon signal 66D corresponds to the fourth infrared beacon 24D, and the fifth individual infrared beacon signal 66E corresponds to the fifth infrared beacon 24E.

Each of the infrared beacons 24 that are part of the beacon network 26 emit an individual infrared beacon signal 66 one at a time, sequentially. In one embodiment, the individual infrared beacon signals 66 are emitted based on round-robin scheduling. Each infrared beacon signal 66 indicates an identifier associated with a specific infrared beacon 24 that is part of the beacon network 26. The navigational computer 22 then compares the identifier associated with the specific infrared beacon 24 with the site code data store 50 to determine the specific geo-reference points corresponding to the specific infrared beacon 24. For example, as seen in FIG. 4, if the specific infrared beacon 24 indicates an identifier of "1", then the navigational computer 22 compares the identifier of "1" with the site code data store 50 to determine the specific geo-reference points associated with the specific infrared beacon 24 having the identifier "1". Although geo-reference points are described, it is to be appreciated that geo-reference points are not necessary as long as information indicating a location of the infrared beacon 24 relative to the landing site 32 is available.

Referring to FIGS. 1 and 3, the navigational computer 22 of the aircraft then determines a location of the aircraft 12 based on two or more of the infrared beacon signals 66. Specifically, the navigational computer 22 determines the location of the aircraft 12 by triangulation of the infrared beacon signals 66. Triangulation determines an unknown location (i.e., the location of the aircraft 12) based on angle measurements to two known locations (i.e., the two or more infrared beacons 24). It is to be appreciated that at least two infrared beacon signals 66 are required to determine the location of the aircraft 12, however, introducing additional infrared beacon signals 66 improves the accuracy when determining the location of the aircraft 12.

Once each infrared beacon 24 that is part of the beacon network 26 has transmitted its corresponding individual infrared beacon signal 66, each of the infrared beacons 24 then emits an infrared end signal 68 simultaneously. In other words, the infrared start signal 62, the infrared site signal 64, and the infrared end signal 68 are emitted by each of the infrared beacons 24 that are part of the beacon network 26 simultaneously, however, the individual infrared beacon signals 66 are sent individually. However, it is to be appreciated that this is one example of coded pulses. For example, in another embodiment, the infrared start signal 62 may not be emitted simultaneously. It is to be appreciated that if the infrared start signal 62, the infrared site signal 64, and the infrared end signal 68 are emitted simultaneously, this increases the strength of the respective infrared signal by a multiple of N, where N represents the number of infrared beacons 24 that are part of the beacon network 26. For example, in the embodiment as shown in FIGS. 3 and 4, since there are five infrared beacons 24A-24E that are part of the beacon network 26, then the infrared start signal 62, the infrared site signal 64, and the infrared end signal 68 have a strength that is five times stronger than the individual infrared beacon signals 66.

Figure 5A:
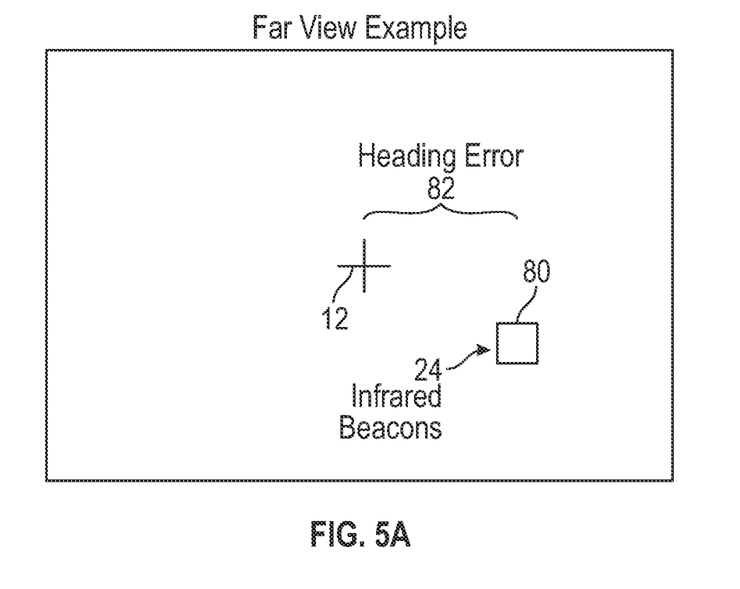
FIG. 5A is a schematic diagram of a far view example of the two or more infrared beacons 24 that the infrared receiver 20 detects, according to an exemplary embodiment.
Figure 5B:
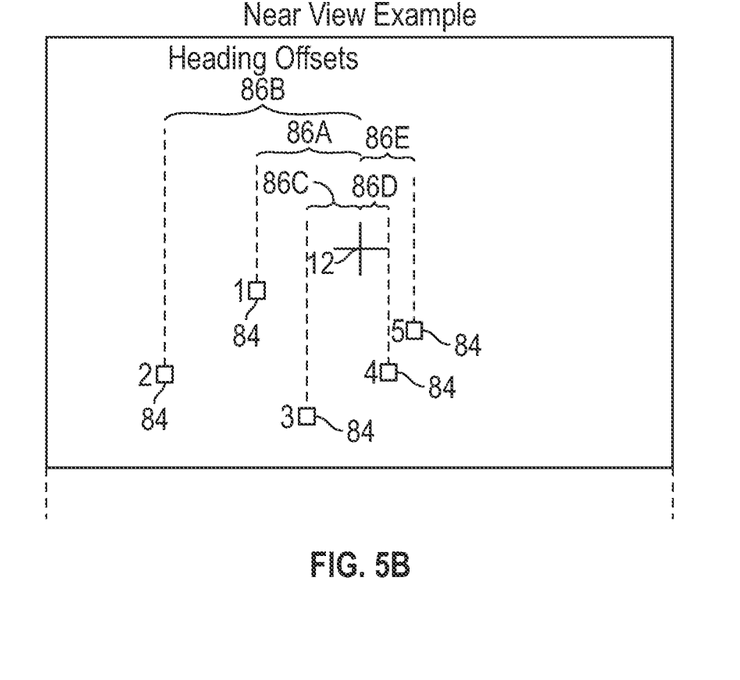
FIG. 5B is a near view example of the same infrared beacons 24 shown in FIG. 5A.

FIG. 5A is a schematic diagram of a far view example of the two or more infrared beacons 24 that the infrared receiver 20 detects, and FIG. 5B is a near view example of the same infrared beacons 24 shown in FIG. 5A. Referring to FIGS. 1 and 5A, in the far view example, the aircraft 12 is at a distance far enough away from the landing site 32 that the infrared receiver 20 is unable to distinguish the individual infrared beacons 24 from one another. Instead, as seen in FIG. 5A, the infrared beacon signals are detected or seen as a single point source 80 by the infrared receiver 20. However, the single point source 80 is a combination of the infrared signals emitted by the infrared beacons 24 that are part of the beacon network 26.

FIG. 5A also illustrates a heading error 82 measured between the aircraft 12 (which is illustrated as a hatch mark in FIGS. 5A and 5B) and the landing site 32, where the landing site 32 is illustrated as the single point source 80. Referring to FIGS. 1, 3, and 5A, in response to receiving the infrared site signal 64, the infrared receiver 20 searches for the two or more infrared beacon signals 66. While the infrared receiver 20 is searching for the infrared beacon signals 66, the navigational computer 22 determines an updated heading for the aircraft 12 based on the heading error 82 between the aircraft 12 and the landing site 32. The navigational computer 22 can then provide the updated heading to a pilot and/or control system that redirects the aircraft 12 based on the updated heading. For example, the updated heading can be provided to a pilot by any number of display devices. In one example, the aircraft 12 is redirected based on actuating various control surfaces of the aircraft 12.

Referring to FIGS. 1, 4, and 5B, as the aircraft 12 navigates towards the landing site 32, the infrared receiver 20 detects the individual beacon signals 84 generated by each individual infrared beacon 24. In the exemplary embodiment as shown in FIG. 5B, each individual beacon signal 84 corresponds to one of the five infrared beacons 24 shown in FIG. 4. FIG. 5B also illustrates five heading offsets 86A, 86B, 86C, 86D, 86E, where each heading offset 86A-86E is measured between the respective individual beacon signal 84 and the aircraft 12. It is to be appreciated that the navigational computer 22 accounts for and removes the heading offsets 86A-86E before determining the location of the aircraft 12.

Referring to FIGS. 1, 2, and 3, in some examples the navigational computer 22 determines the location of the aircraft 12 based on two or more infrared site signals 64. In the embodiment as shown in FIG. 2, the infrared cameras 48A-48D view the infrared beacon signals as a single point source 80 (FIG. 5A). The navigational computer 22 receives the infrared site signals 64 associated with each of the four landing sites 32A-32D and determines the location of the aircraft 12 by triangulation of the landing sites 32A-32D. It is to be appreciated that the landing sites 32A-32D as shown in FIG. 2 are within proximity to one another such that each infrared site signal 64 is detectable at the same time by the infrared receiver 20. Accordingly, the landing sites 32A-32D are located within the same city or region from one another.

Figure 6:
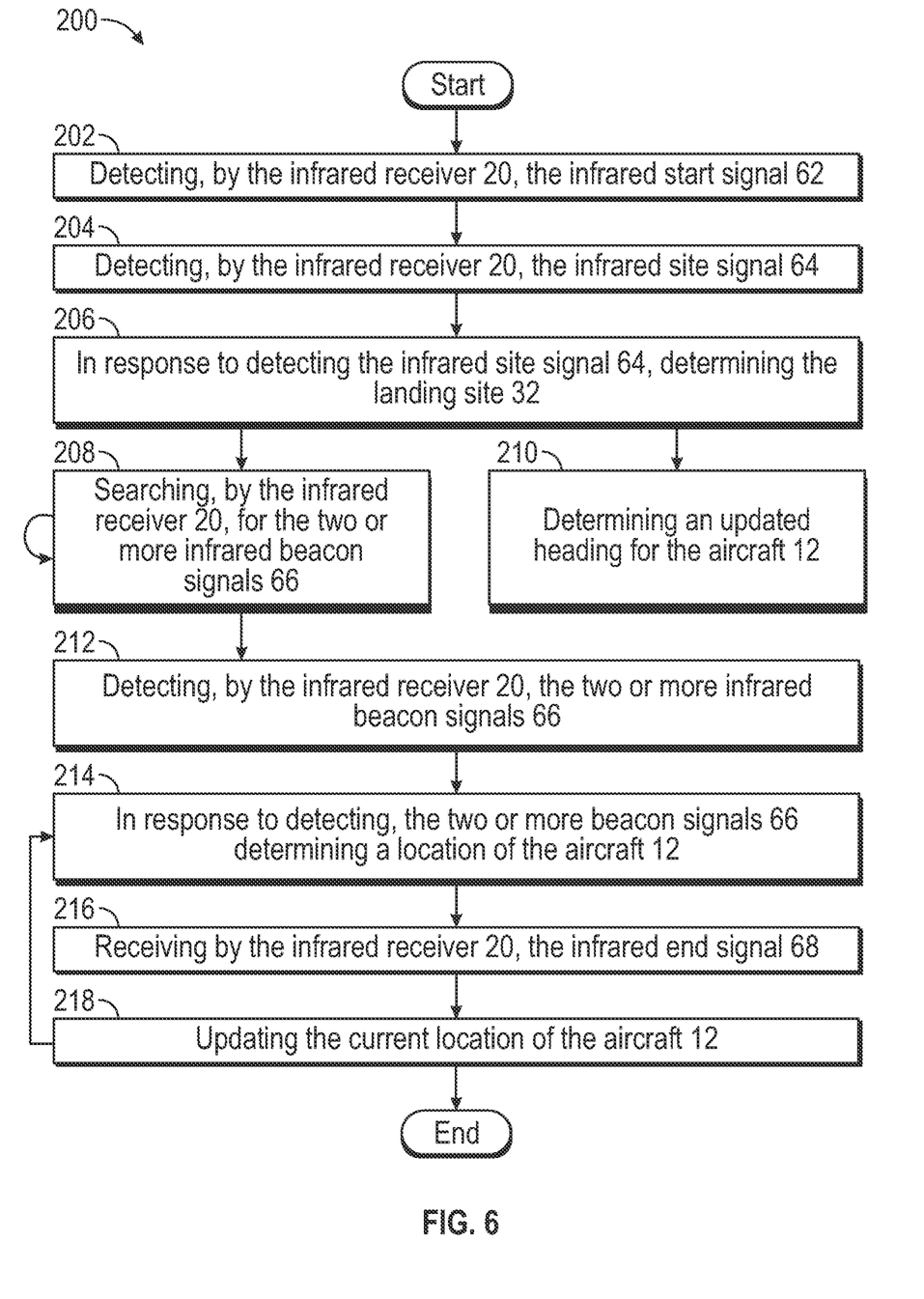
FIG. 6 is a schematic diagram of another embodiment of the infrared beacons, where the infrared emitters are arranged as a polyhedron, according to an exemplary embodiment.

Referring now to FIG. 6, a method 200 for navigating the aircraft 12 to the landing site 32 is illustrated. Referring generally to FIGS. 1-6, the method 200 begins at block 202. In block 202, the infrared receiver 20 of the aircraft 12 detects the infrared start signal 62 (FIG. 3). The method 200 proceeds to block 204.

In block 204, the infrared receiver 20 of the aircraft 12 detects an infrared signal indicating the infrared site signal 64 (FIG. 3), where the infrared site signal 64 indicates the landing site 32 (FIGS. 1 and 2) for the aircraft 12. It is to be appreciated that the infrared start signal 62 and the infrared site signal 64 are transmitted in sequence, beginning with the infrared start signal 62. The method 200 proceeds to block 206.

In block 206, in response to detecting the infrared site signal 64, the navigational computer 22 identifies the landing site 32 indicated by the infrared site signal 64. As mentioned above, each infrared beacon 24 located around the landing site 32 that forms the beacon network 26 transmits the infrared site signal, for example simultaneously. The method 200 may then proceed to block 208 (e.g., if determined that the aircraft 12 is to land at, or be routed towards, the detected landing site).

In block 208, the infrared receiver 20 searches for the two or more infrared beacon signals 66 that are part of the beacon network 26, where each infrared beacon signal 66 corresponds to an individual infrared beacon 24 located around the landing site 32. The method 200 proceeds to block 210.

In block 210, the navigational computer 22 determines an updated heading for the aircraft 12 based on the landing site 32 indicated by the infrared site signal 64. In one non-limiting embodiment, the navigational computer 22 determines the updated heading the two or more infrared beacon signals 66, however, it is to be appreciated that determining the updated heading may be performed interpedently of searching. The navigational computer 22 then redirects the aircraft 12 based on the updated heading. The method 200 proceeds to block 212.

In block 212, the infrared receiver 20 detects the two or more infrared beacon signals 66. The method 200 then proceeds to block 214.

In block 214, in response to detecting the two or more infrared beacon signals 66, the navigational computer 22 determines a location of the aircraft 12 based on the two or more infrared beacon signals 66. Specifically, the location of the aircraft 12 is determined by triangulation of the two or more infrared beacon signals 66. The method 200 proceeds to block 216.

In block 216, the infrared receiver 20 receives the infrared end signal 68, where the infrared end signal indicates that each infrared beacon 24 that is part of the beacon network 26 has transmitted a respective infrared beacon signal 66. The method 200 proceeds to block 218.

In block 218, the navigational computer 22 updates the current location 36 of the aircraft 12 with the location determined based on the two or more infrared beacon signals 66. The method either returns to block 214 to continue guiding the aircraft 12 towards the landing site 32 based on the location of the aircraft 12 or alternatively, if the navigational computer 22 has finished guiding the aircraft 12, then the method 200 terminates.

Figure 7A:
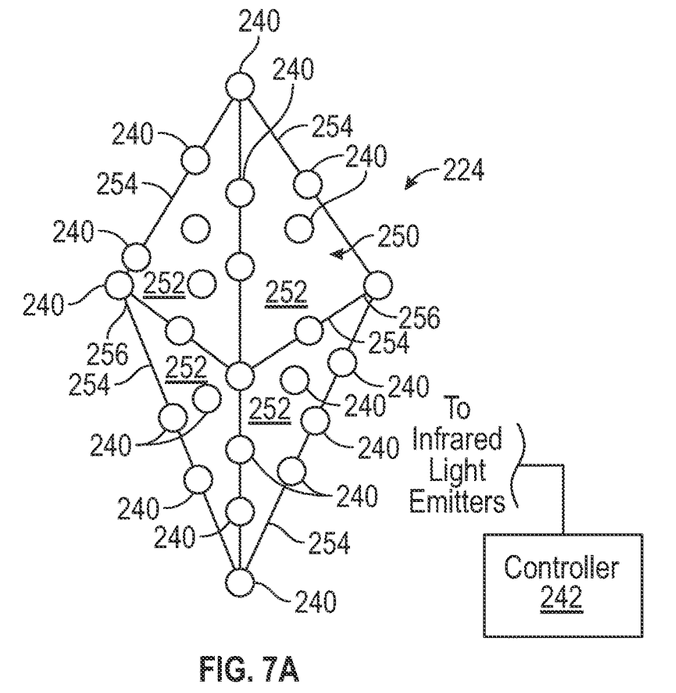
FIG. 7A is an alternative embodiment of the infrared emitter shown in FIG. 1 in the shape of a polyhedron, according to an exemplary embodiment.
Figure 7B:
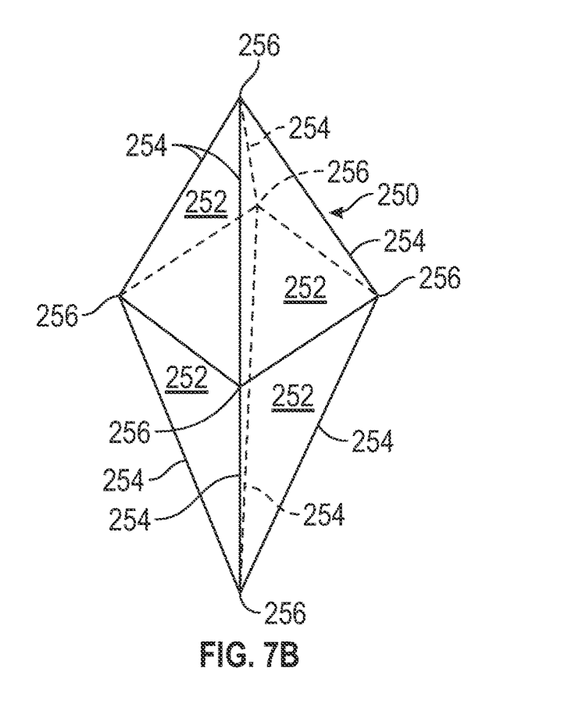
FIG. 7B is a transparent view of the polyhedron shown in FIG. 7A, according to an exemplary embodiment.

It is to be appreciated that the infrared beacons 24 shown in FIG. 1 allow for distance-to-object measurements. However, it is not possible to determine an orientation of a particular infrared beacon 24, especially when numerous infrared beacons 24 are co-located in the same field of view as the observer. FIGS. 7A and 7B illustrate an alternative embodiment of an infrared beacons 224 that is part of the beacon network 26 seen in FIG. 1, where an orientation of the infrared beacon 224 as well as a distance measurement is performed by the navigational computer 22 (FIG. 1). For example, FIG. 7A illustrates an infrared beacon 224 comprises a plurality of infrared light emitters 240 that are arranged in a defined shape. The defined shape is any type of geometric figure that includes a three-dimensional configuration, such as a polyhedron 250. The defined shape of the infrared beacon 224 allows for the navigational computer 22 (FIG. 1) to determine orientation in addition to distance. In the non-limiting embodiment as shown in FIG. 7A, the polyhedron is an octahedron, however, other types of polyhedrons may be used as well. Specifically, the polyhedron 250 is determined based on the complexity of the data that is being transmitted, where more complex data requires a polyhedron having more faces, while less complex data requires a polyhedron having fewer faces. In another embodiment, instead of a polyhedron, the infrared beacon 224 comprises another three-dimensional shape such as, for example, a sphere or a cylinder as well.

As seen in FIG. 7B, the polyhedron 250 comprises a plurality of faces 252, a plurality of edges 254, and a plurality of vertices 256. Specifically, in the example as shown, the octahedron comprises eight faces 252, eight edges 254, and six vertices 256. Referring to FIG. 7A, the infrared light emitters 240 are oriented to emit infrared light outwardly, towards the environment. The infrared light emitters 240 comprise coherent sources of light, noncoherent sources of light, or a combination of coherent and noncoherent sources of light. In an embodiment, the coherent light source is an infrared laser and the noncoherent light source is an infrared LED. In one exemplary embodiment, the coherent light sources perform pattern flashing in the near and far fields, while the noncoherent light sources perform pattern flashing in the near field as well as general beacon strobing in the far field.

The plurality of infrared light emitters 240 are in electronic communication with a controller 242. One or more infrared light emitters 240 are positioned on each of the faces 252 of the polyhedron 250, along each of the edges 254 of the polyhedron 250, and on each vertex 256 of the polyhedron 250. In one embodiment, the controller 242 instructs the infrared light emitters 240 located at each vertex 256 of the polyhedron 250 to flash once per cycle. The controller 242 instructs the infrared light emitters 240 located on each face 252 and each edge 254 to flash simultaneously at some predetermined frequency per cycle, where no two faces 252 of the polyhedron 250 flash at the same frequency. Finally, the infrared light emitters 240 on each face 252 of the polyhedron 250 flash at a unique prime number per cycle, where no two faces 252 of the polyhedron 250 share the same prime number. The prime number assures that each face 252 may not be mistaken for another face 252 due to sampling issues. For example, depending on the sampling time, a cycle of twenty times per cycle may appear to be the same as forty times per cycle. Accordingly, the navigational computer 22 (FIG. 1) determines an orientation of the polyhedron 250 based on the different flashing patterns of the infrared light emitters 240 disposed on the faces 252, edges 254, and vertices 256 of the infrared beacon 224.

Although prime numbers are described, it is to be appreciated that if the maximum sampling rate is known, then the infrared beacon 224 or a smaller set of infrared beacons 224 may be provided having flash patterns that is not cycled based on prime numbers. However, in this example, none of the infrared light emitters 240 have a flash rate greater than the sampling rate. Furthermore, in an embodiment, the maximum flash rate of the infrared light emitters 240 would have a maximum flash rate that is less than half the sampling rate. Therefore, it is to be appreciated that while non-prime numbers may be used, they also comprise more limitations.

In one embodiment, the infrared beacon 224 is covered by an optically diffusing material such as, for example, a frosted pane or acrylic or glass that obfuscates the individual infrared light emitters 240. In this manner, a unique power spectral density (PSD) signature is still detected, while still preventing the observation of the individual infrared light emitters 240. In an embodiment, the disclosed infrared beacon 224 provides visual cryptography by allowing each infrared beacon 224 to authenticate itself, while at the same time preventing others from copying the unique flash pattern. It is to be appreciated that in some embodiments the disclosed infrared beacon 224 comprises different flashing patterns to denote unique targets or specific beacons. In another embodiment, two or more infrared beacons 224 with identical flash patterns are placed upon a common target to denote target scale.

Referring generally to the figures, the disclosed system and method for determining a location of an aircraft provides various technical effects and benefits. Specifically, the disclosed system provides a reliable, cost-effective, and accurate approach to determine a location of an aircraft within three-dimensional airspace as the aircraft approaches a landing area based on triangulating infrared signals emitted from beacons located at the landing site. The aircraft may calculate its location from a relatively significant distance from the landing site and continues to calculate the location as the aircraft approaches the landing site, where the accuracy of the location improves as the aircraft approaches the landing site. It is to be appreciated that infrared signals are relatively difficult to spoof or overwrite. As a result, the disclosed system is capable of providing reliable, cost-effective navigation even during a GPS denied scenario. Furthermore, in some embodiments, one or more infrared beacons that are part of a beacon network may comprise a plurality of infrared emitters arranged in a polyhedron. These infrared beacons provide not only distance-to-target measurements, but also indicate an orientation relative to an observer as well.

Figure 8:
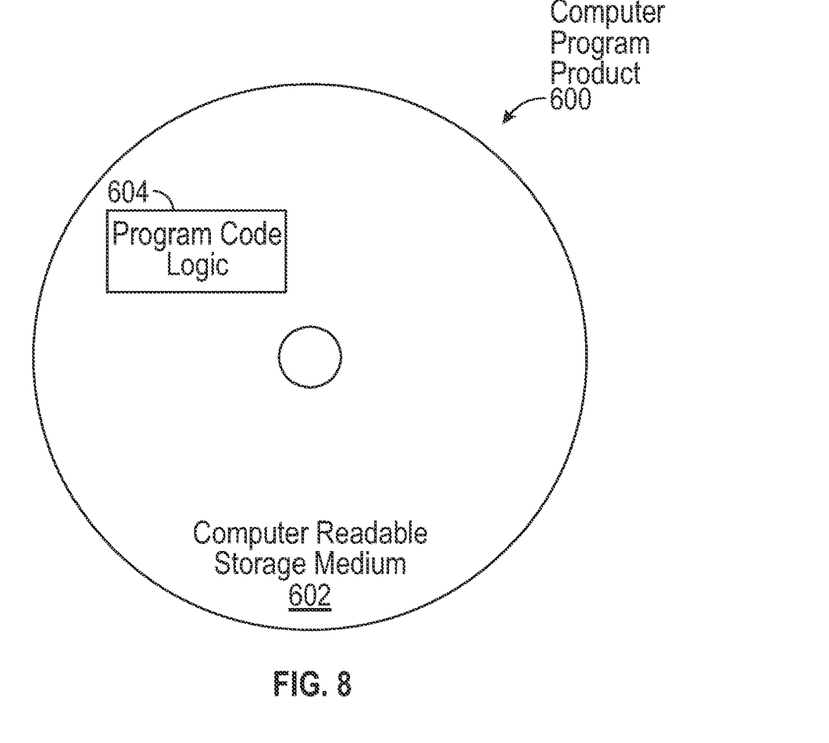
FIG. 8 illustrates a computer program product including one or more storage media, according to an exemplary embodiment.

Referring now to FIG. 8, in one example, a computer program product 600 includes one or more non-transitory computer readable storage mediums 602. The storage medium 602 stores computer readable program code or logic 604 thereon to provide and facilitate one or more aspects of embodiments described herein. The program code or logic is created using a compiler or assembler for example, to assemble instructions, that, when executed perform aspects of embodiments. The program code, when created and stored on a tangible medium, is referred to as a computer readable medium. Some examples of a computer readable medium include, but are not limited to, electronic memory modules (RAM), flash memory, and compact discs (CDs). The computer program product medium is readable by a processing circuit in a computer system for execution by a processing circuit.

Figure 9:
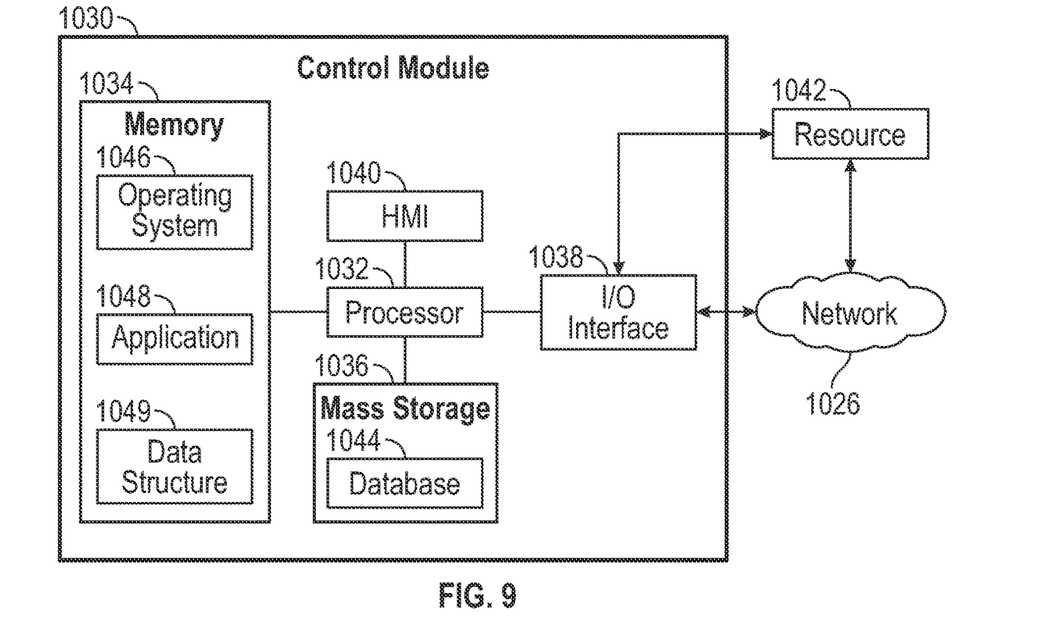
FIG. 9 is a computer system, according to an exemplary embodiment.

Referring to FIG. 9, the system 10 and/or navigational computer 22 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A data store 1044 may reside on the mass storage memory device 1036 and may be used to collect and organize data used by the various systems and modules described herein. The data store 1044 may include data and supporting data structures that store and organize the data. In particular, the data store 1044 may be arranged with any data store organization or structure including, but not limited to, a relational database, a hierarchical database, a network database, or combinations thereof. A database management system in the form of a computer software application executing as instructions on the processor 1032 may be used to access the information or data stored in records of the data store 1044 in response to a query, where a query may be dynamically determined and executed by the operating system 1046, other applications 1048, or one or more modules.

Further, the disclosure comprises embodiments according to the following clauses:

Clause 1: a system for facilitating navigation of an aircraft, the system comprising: one or more processors; and a memory coupled to the one or more processors, the memory storing data into a data store and program code that, when executed by the one or more processors, causes the system to: detect an infrared site signal indicating a site code, wherein the site code represents a site for the aircraft; in response to detecting the infrared site signal, determine the site indicated by the site code, wherein two or more infrared beacons that form a beacon network around the landing site each transmit the infrared site signal; search for two or more infrared beacon signals, wherein each infrared beacon signal is transmitted by an individual beacon of the beacon network; detect the two or more infrared beacon signals; and in response to detecting the two or more infrared beacon signals, determine a location of the aircraft based on the two or more infrared beacon signals.

Clause 2: The system of clause 1, wherein the one or more processors execute instructions to: update a current location of the aircraft with the location of the aircraft determined based on the two or more infrared beacon signals, wherein the current location of the aircraft is determined based on measurements from an inertial measurement unit.

Clause 3: The system of any of clauses 1 or 2, wherein the one or more processors execute instructions to: detect an infrared start signal, wherein the infrared start signal and the infrared site signal are transmitted in sequence beginning with the infrared start signal.

Clause 4: The system of any of clauses 1, 2, or 3, wherein the infrared start signal and the infrared site signal are transmitted by the two or more infrared beacons that are part of the beacon network simultaneously.

Clause 5: The system of any of clauses 1, 2, 3, or 4, wherein the one or more processors execute instructions to: detect each of the two or more infrared beacon signals, wherein each of the infrared beacons of the beacon network transmit an individual infrared beacon signals one at a time sequentially.

Clause 6: The system of any of clauses 1, 2, 3, 4, or 5, wherein the one or more processors execute instructions to: detect an infrared end signal, wherein the infrared end signal is transmitted simultaneously by the two or more infrared beacons after all the infrared beacon signals have been transmitted.

Clause 7: The system of any of clauses 1, 2, 3, 4, 5, or 6, wherein the one or more processors execute instructions to: determine an updated heading for the aircraft based on the site; and facilitate redirecting the aircraft based on the updated heading.

Clause 8: The system of any of clauses 1, 2, 3, 4, 5, 6, or 7, wherein the location of the aircraft is determined by triangulation of the two or more infrared beacon signals.

Clause 9: The system of any of clauses 1, 2, 3, 4, 5, 6, 7, or 8, wherein the one or more processors is configured to determine one or more instructions for at least one of guidance, navigation, or control of the aircraft towards the site based on the location of the aircraft determined using the two or more infrared beacon signals.

Clause 10: The system of any of clauses 1, 2, 3, 4, 5, 6, 7, 8, or 9, further comprising a site code data store in communication with one or more data stores, and wherein the site code data store stores a plurality of site codes, wherein each of the plurality of site codes corresponds to a specific landing site for the aircraft.

Clause 11: The system of any of clauses 1, 2, 3, 4, 5, 6, 7, 8, 9, or 10, comprising a site code data store in communication with one or more data stores, and wherein the site code data store stores data indicating a location of the two or more infrared beacons for a specific landing site.

Clause 12: The system of any of clauses 1, 2, 3, 4, 5, 6, 7, 8, 9, 10, or 11, wherein one or more infrared beacons of the beacon network comprise a plurality of infrared light emitters arranged in a defined shape.

Clause 13: The system of any of clauses 1, 2, 3, 4, 5, 6, 7, 8, 9, 10, 11, or 12, wherein the defined shape is a polyhedron comprising a plurality of faces, a plurality of edges, and a plurality of vertices, and wherein an infrared light emitter is placed at each vertex and where one or more infrared light emitters are placed on each edge and on each face of the polyhedron.

Clause 14: The system of any of clauses 1, 2, 3, 4, 5, 6, 7, 8, 9, 10, 11, 12, or 13, wherein the one or more processors execute instructions to: instruct the infrared light source located at each of the vertices to flash once per cycle; and instruct the infrared light emitters located on each face and each edge to flash simultaneously at a predetermined frequency per cycle, wherein no two faces of the polyhedron flash at the same frequency.

Clause 15: The system of any of clauses 1, 2, 3, 4, 5, 6, 7, 8, 9, 10, 11, 12, 13, or 14, wherein the infrared light emitters on each face of the polyhedron flash at a unique prime number per cycle.

Clause 16: A method for facilitating navigation of an aircraft, the method comprising: detecting, by an infrared receiver, an infrared site signal indicating a site code, wherein the site code represents a site for the aircraft; in response to detecting the infrared site signal, determining, by a computer, the site indicated by the site code, wherein two or more infrared beacons that form a beacon network each transmit the infrared site signal; searching, by the infrared receiver, for two or more infrared beacon signals, wherein each infrared beacon signal corresponds to an individual beacon of the beacon network; detecting, by the infrared receiver, the two or more infrared beacon signals; in response to detecting the two or more infrared beacon signals, triangulating, by the computer, a location of the aircraft based on the two or more infrared beacon signals; and updating a current location of the aircraft with the location, wherein the current location of the aircraft is determined based on measurements from an inertial measurement unit.

Clause 17: The method of clause 16, further comprising: detecting, by the infrared receiver, each of the two or more infrared beacon signals, wherein each of the infrared beacons of the beacon network transmit an individual infrared beacon signals one at a time sequentially.

Clause 18: The method of any of clauses 16 or 17, further comprising: detecting, by the infrared receiver, an infrared end signal, wherein the infrared end signal is transmitted simultaneously by the two or more infrared beacons that are part of the beacon network after all of the individual infrared beacon signals have been transmitted.

Clause 19: A non-transitory computer readable storage medium readable by a processing circuit and storing instructions that when executed by the processing circuit perform method operations, comprising: receiving, from an infrared receiver, an infrared site signal indicating a site code, wherein the site code represents a landing site for an aircraft; in response to receiving the infrared site signal, determining the landing site indicated by the site code, wherein two or more infrared beacons that form a beacon network around the landing site each transmit the infrared site signal; initiating a scan for two or more infrared beacon signals, wherein each infrared beacon signal corresponds to an individual beacon of the beacon network; in response to detecting the two or more infrared beacon signals, triangulating a location of the aircraft based on the two or more infrared beacon signals; and updating a current location of the aircraft with the location.

Clause 20: the non-transitory computer readable storage medium of clause 19, wherein the processing circuit further performs the operation of: updating a current location of the aircraft with the location of the aircraft determined based on the two or more infrared beacon signals, wherein the current location of the aircraft is determined based on measurements from an inertial measurement unit.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein The description of the subject disclosure is merely exemplary in nature and variations that do not depart from the gist of the subject disclosure are intended to be within the scope of the subject disclosure. Such variations are not to be regarded as a departure from the spirit and scope of the subject disclosure.

To the extent that terms "includes," "including," "has," "contains," and variants thereof are used herein, such terms are intended to be inclusive in a manner similar to the term "comprises" as an open transition word without precluding any additional or other elements.

What is claimed is:

1. A system that facilitates navigation of an aircraft, the system comprising:
one or more processors;
a site code data store in communication with one or more data stores, wherein the site code data store stores data indicating a location of two or more infrared beacons for a specific landing site; and
a memory operationally coupled to the one or more processors, the memory storing data into a data store and program code that, when executed by the one or more processors, causes the system to:
detect an infrared site signal indicating a site code transmitted by the one or more infrared beacons that form a beacon network around the specific landing site, wherein the site code represents the specific landing site, wherein the one or more infrared beacons of the beacon network comprise a plurality of infrared light emitters arranged in a defined shape that includes a three-dimensional configuration, and wherein the defined shape is a polyhedron comprising a plurality of faces, a plurality of edges, and a plurality of vertices and one or more infrared light emitters are placed at each vertex, on each edge, and on each face of the polyhedron, and wherein the defined shape of the plurality of infrared light emitters allow for the one or more processors to determine an orientation of a particular beacon of the beacon network;
in response to detecting the infrared site signal, determine the specific landing site indicated by the site code;
search for two or more infrared beacon signals, wherein each infrared beacon signal is transmitted by an individual beacon of the beacon network and indicates an identifier associated with a specific infrared beacon that is part of the beacon network, wherein the specific infrared beacon transmits one of the two or more infrared beacon signals;
detect the two or more infrared beacon signals;
determine the location of each infrared beacon that is part of the beacon network by comparing the identifier associated with the specific infrared beacon with the data stored in the site code data store indicating the location of the two or more infrared beacons to determine the location of the specific infrared beacon; and
in response to detecting the two or more infrared beacon signals, determine a location of the aircraft by triangulation of the two or more infrared beacon signals.

2. The system of claim 1, wherein the one or more processors execute instructions to:
update a current location of the aircraft with the location of the aircraft determined based on the two or more infrared beacon signals, wherein the current location of the aircraft is determined based on measurements from an inertial measurement unit.

3. The system of claim 1, wherein the one or more processors execute instructions to:
detect an infrared start signal, wherein the infrared start signal and the infrared site signal are transmitted in sequence beginning with the infrared start signal.

4. The system of claim 3, wherein the infrared start signal and the infrared site signal are transmitted by the two or more infrared beacons that are part of the beacon network simultaneously.

5. The system of claim 1, wherein the one or more processors execute instructions to:
detect each of the two or more infrared beacon signals, wherein each of the infrared beacons of the beacon network transmit an individual infrared beacon signals one at a time sequentially.

6. The system of claim 1, wherein the one or more processors execute instructions to:
detect an infrared end signal, wherein the infrared end signal is transmitted simultaneously by the two or more infrared beacons after all the infrared beacon signals have been transmitted.

7. The system of claim 1, wherein the one or more processors execute instructions to:
determine an updated heading for the aircraft based on the specific landing site; and
facilitate redirection of the aircraft based on the updated heading.

8. The system of claim 1, wherein the one or more processors is configured to determine one or more instructions for at least one of guidance, navigation, or control of the aircraft towards the specific landing site based on the location of the aircraft determined using the two or more infrared beacon signals.

9. The system of claim 8, wherein the site code data store stores a plurality of site codes, wherein each of the plurality of site codes corresponds to a specific landing site for the aircraft.

10. The system of claim 1, wherein the one or more processors execute instructions to:
instruct the infrared light emitters located at each of the vertices to flash once per cycle; and
instruct the infrared light emitters located on each face and each edge to flash simultaneously at a predetermined frequency per cycle, wherein no two faces of the polyhedron flash at the same frequency.

11. The system of claim 1, wherein the infrared light emitters on each face of the polyhedron flash at a unique prime number per cycle.

12. A method that facilitates navigation of an aircraft, the method comprising:
detecting, by an infrared receiver, an infrared site signal indicating a site code, wherein the site code represents a specific landing site for the aircraft;
in response to detecting the infrared site signal, determining, by a computer, the specific landing site indicated by the site code, wherein two or more infrared beacons that form a beacon network each transmit the infrared site signal, and wherein the computer is in electronic communication with a site code data store in communication with one or more data stores, wherein the site code data store stores data indicating a location of two or more infrared beacons for a specific landing site;

searching, by the infrared receiver, for two or more infrared beacon signals, wherein each infrared beacon signal corresponds to an individual beacon of the beacon network and indicates an identifier associated with a specific infrared beacon that is part of the beacon network, wherein the specific infrared beacon transmits one of the two or more infrared beacon signals, and wherein the one or more infrared beacons of the beacon network comprise a plurality of infrared light emitters arranged in a defined shape that includes a three-dimensional configuration, and wherein the defined shape is a polyhedron comprising a plurality of faces, a plurality of edges, and a plurality of vertices and one or more infrared light emitters are placed at each vertex, on each edge, and on each face of the polyhedron, and wherein the defined shape of the plurality of infrared light emitters allow for the computer to determine an orientation of a particular beacon of the beacon network;

detecting, by the infrared receiver, the two or more infrared beacon signals;

determining the location of each infrared beacon that is part of the beacon network by comparing the identifier associated with the specific infrared beacon with the data stored in the site code data store indicating the location of the two or more infrared beacons to determine the location of the specific infrared beacon;

in response to detecting the two or more infrared beacon signals, triangulating, by the computer, a location of the aircraft based on the two or more infrared beacon signals; and updating a current location of the aircraft with the location, wherein the current location of the aircraft is determined based on measurements from an inertial measurement unit.

13. The method of claim 12, further comprising:
detecting, by the infrared receiver, each of the two or more infrared beacon signals, wherein each of the infrared beacons of the beacon network transmit an individual infrared beacon signals one at a time sequentially.

14. The method of claim 12, further comprising:
detecting, by the infrared receiver, an infrared end signal, wherein the infrared end signal is transmitted simultaneously by the two or more infrared beacons that are part of the beacon network after all of the individual infrared beacon signals have been transmitted.

15. A non-transitory computer readable storage medium readable by a processing circuit and storing instructions that when executed by the processing circuit perform method operations, comprising:

receiving, from an infrared receiver, an infrared site signal indicating a specific landing site code, wherein the site code represents a landing site for an aircraft;

in response to receiving the infrared site signal, determining the landing site indicated by the site code, wherein two or more infrared beacons that form a beacon network around the landing site each transmit the infrared site signal, and wherein the non-transitory computer readable storage medium is in electronic communication with a site code data store in communication with one or more data stores, wherein the site code data store stores data indicating a location of two or more infrared beacons for a specific landing site, and wherein one or more infrared beacons of the beacon network comprise a plurality of infrared light emitters arranged in a defined shape that includes a three-dimensional configuration, and wherein the defined shape is a polyhedron comprising a plurality of faces, a plurality of edges, and a plurality of vertices and one or more infrared light emitters are placed at each vertex, on each edge, and on each face of the polyhedron, and wherein the defined shape of the plurality of infrared light emitters allow for the non-transitory computer readable storage medium to determine an orientation of a particular beacon of the beacon network;

initiating a scan for two or more infrared beacon signals, wherein each infrared beacon signal corresponds to an individual beacon of the beacon network and indicates an identifier associated with a specific infrared beacon that is part of the beacon network, wherein the specific infrared beacon transmits one of the two or more infrared beacon signals;

determining the location of each infrared beacon that is part of the beacon network by comparing the identifier associated with the specific infrared beacon with the data stored in the site code data store indicating the location of the two or more infrared beacons to determine the location of the specific infrared beacon;

in response to detecting the two or more infrared beacon signals, triangulating a location of the aircraft based on the two or more infrared beacon signals; and updating a current location of the aircraft with the location.

16. The non-transitory computer readable storage medium of claim 15, wherein the processing circuit further performs the operation of:

updating a current location of the aircraft with the location of the aircraft determined based on the two or more infrared beacon signals, wherein the current location of the aircraft is determined based on measurements from an inertial measurement unit.

17. The system of claim 1, wherein the location of each infrared beacon that is part of the beacon network is expressed as a geo-reference point.

18. The system of claim 1, wherein the one or more infrared beacons that form a beacon network are located at an airport.

19. The system of claim 1, wherein the polyhedron is an octahedron.

20. The system of claim 1, wherein the plurality of infrared light emitters includes one or more of the following: coherent sources of light and noncoherent sources of light.

* * * * *